United States Patent
Buchanan, Jr. et al.

(10) Patent No.: US 7,213,102 B2
(45) Date of Patent: May 1, 2007

(54) APPARATUS METHOD AND SYSTEM FOR ALTERNATE CONTROL OF A RAID ARRAY

(75) Inventors: William W. Buchanan, Jr., Wake Forest, NC (US); Simon Chu, Chapel Hill, NC (US); Linda A. Rledle, Cary, NC (US); Paul B. Tippett, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 671 days.

(21) Appl. No.: 10/608,826

(22) Filed: Jun. 26, 2003

(65) Prior Publication Data

US 2004/0268037 A1    Dec. 30, 2004

(51) Int. Cl.
*G06F 12/00* (2006.01)
(52) U.S. Cl. .......................................... 711/114; 711/5
(58) Field of Classification Search ...................... None
See application file for complete search history.

(56) References Cited

U.S. PATENT DOCUMENTS

| | | | |
|---|---|---|---|
| 6,009,535 A | 12/1999 | Halligan et al. ................ 714/5 |
| 6,073,218 A * | 6/2000 | DeKoning et al. .......... 711/150 |
| 6,408,343 B1 | 6/2002 | Erickson et al. .............. 710/15 |
| 6,834,326 B1 * | 12/2004 | Wang et al. ................. 711/114 |
| 2004/0103337 A1 * | 5/2004 | Smith ............................ 714/2 |

FOREIGN PATENT DOCUMENTS

JP        2001290669        10/2001

OTHER PUBLICATIONS

Fail-Over Method For Fast-Write SCSI Adapter, IBM Technical Disclosure Bulletin, pp. 161-162.

* cited by examiner

*Primary Examiner*—Reginald Bragdon
*Assistant Examiner*—Thanh D Vo
(74) *Attorney, Agent, or Firm*—Kunzler & Associates

(57) ABSTRACT

Secondary or augmented control of a storage array in a cost effective manner is accomplished by connecting a host to the storage array via a storage adapter independent of a RAID controller. The RAID controller provides primary control for services standard to the RAID controller. Augmented or enhanced services as well as backup control are provided by a control module executing on the host, communicating to one or more selected storage devices within the storage array via the storage adapter. In one embodiment, the control module detects faults or failures in the RAID controller, selectably directs storage commands to the RAID controller, emulates a storage controller including a RAID controller, and provides enhanced or augmented services such as conducting diagnostic, firmware update, or disaster recovery operations.

28 Claims, 7 Drawing Sheets

APPARATUS METHOD AND SYSTEM FOR ALTERNATE CONTROL OF A RAID ARRAY

BACKGROUND OF THE INVENTION

1. The Field of the Invention

The invention relates to apparatuses, methods, and systems for controlling arrays of storage devices. Specifically, the invention relates to apparatus, methods, and systems for redundantly controlling a storage array.

2. The Relevant Art

RAID systems (i.e., systems using Redundant Arrays of Independent Disks) are used to store large quantities of data within computer and storage networks. RAID systems are designed to be fault resistant and fault tolerant by distributing data among redundant arrays of independent disks usually with some form of error coding. Storage device redundancy and redundant data encoding facilitate continued operation and/or data recovery in the event of a failure within a particular storage device.

In addition to redundant storage devices, RAID systems often deploy redundant controllers to facilitate continued operation after a particular controller becomes inoperable. In addition to handling failures and controller redundancy properly, RAID controllers are typically required to receive write requests and associated data from a host computer, acknowledge reception of the data, stripe the data over a plurality of drives, and send the data to a storage array at a high throughput rate. As a result, RAID controllers are highly specialized and complex devices.

The specialized nature of RAID controllers, particularly redundant RAID controllers presents several challenges. In many redundant configurations, a secondary RAID controller waits in a standby or load sharing mode, ready to receive commands from the host computer in case a primary RAID controller is busy or fails. In some configurations, the secondary RAID controller performs no other function than waiting to take control in case of failure. The secondary RAID controller, although useful, adds significant cost to the RAID system.

RAID controllers are typically quite reliable in that they are typically solid state solutions with highly reliable components. In an attempt to reduce system cost, some administrators may forego using a redundant controller. Foregoing a controller is a risky proposition in that losses from downtime frequently exceed the cost of an entire system. Nevertheless, a demand for single controller solutions currently exists within data processing systems.

Furthermore, as specialized devices with specialized hardware to increase throughput, RAID controllers tend to fall out of date quickly—particularly as a system is updated and upgraded. Updating redundant RAID controllers requires purchasing the controllers in pairs. The added cost of the secondary RAID controller may hinder RAID system users from purchasing new controllers that could add significant functionality to their RAID systems. In addition, prolonging upgrades of old RAID controllers may place the controllers at additional risk for obsolescence or failure.

Another disadvantage of currently available storage control solutions is that, as solid state devices, RAID controllers are often fixed in their feature set at the time of manufacture and typically provide no facility for enhanced or augmented services such as advanced data recovery services, diagnostic services, firmware update services, and the like.

Given the disadvantages of currently available storage control solutions, what is needed is a cost-effective apparatus, method, and system for redundant control of a RAID system without using a dedicated secondary controller. Such an apparatus and method would reduce the cost of providing, upgrading, and augmenting RAID functionality within storage systems.

SUMMARY OF THE INVENTION

The various elements of the present invention have been developed in response to the present state of the art, and in particular, in response to the problems and needs in the art that have not yet been fully solved by currently available redundantly controlled storage systems. Accordingly, the present invention provides an improved apparatus, method, and system for storage control of storage devices.

The present invention eliminates the need for a dedicated secondary controller by using a host-based adapter and associated control and emulation software executing on a host. In the context of the present specification, the term "dedicated controller" refers to a storage controller, particularly a RAID controller, with dedicated resources such as a CPU, logic unit, or the like. In particular, the present invention uses the shared resources of the host to reduce the cost and complexity of provided redundant control of a storage array or the like, while offering the additional advantage of augmented or enhanced services typically not found on currently available controllers.

In a first aspect of the present invention, an apparatus for storage control of a storage array includes a RAID controller operably connected to a storage array, a storage adapter residing on a host computer that is also operably connected to the storage array independent of the RAID controller, and a control module residing on the host computer. Due to the unique configuration of the present invention, the storage adapter is able to transmit storage commands to a selected storage device within the storage array.

In one embodiment, the control module selectively directs storage commands to the RAID controller and the storage adapter. During normal operation, the control module may direct commands supported by the RAID controller to the RAID controller and direct commands related to augmented or enhanced services to the storage adapter. In response to an inoperable RAID controller, the control module may also emulate the RAID controller and conduct operations corresponding to storage commands on one or more selected storage devices within the storage array.

As described in the present invention the storage adapter is an electrical interface between the control module and the storage devices. Possible implementations of the storage adapter include a SCSI adapter, an SSA adapter, a fiberchannel adapter, an IDE adapter, or the like. Using a standard storage adapter such as the aforementioned adapters often facilitates using the present invention without purchasing additional hardware.

A controller storage adapter may also provide an interface between the control module and the RAID controller. However, in certain embodiments, the RAID controller does not interface with a storage adapter, but rather resides on the host computer. By including the RAID controller on the host computer, the present invention may provide improved performance in a more cost-effective manner than previous solutions.

There are many possible different implementations for the RAID controller. Some implementations include a SCSI RAID controller, an SSA RAID controller, a fiberchannel RAID controller, an IDE RAID controller, or the like. Those skilled in the art may also derive other implementations for the RAID controller.

In certain embodiments, the control module selectively emulates a RAID controller. By emulating a RAID controller, the control module may conduct RAID operations as well as non-RAID operations on the storage devices via the storage adapter. In one embodiment, the supported operations include read operations, write operations, recovery operations, diagnostic operations, formatting operations, and firmware update operations. In one embodiment, the control module is a device driver that translates operating system calls to storage device commands.

In one embodiment, the control module also includes a multipath software layer that selects a control path through either the RAID controller or the storage adapter. The multipath software layer may also select multiple control paths in parallel to allow the control module to perform augmented services on the storage devices while the RAID controller is performing standard services on the storage devices. Thus, the present invention provides cost-effective enhanced functionality to the RAID system.

In another aspect of the present invention, a method for controlling a storage array includes transmitting storage commands to a RAID controller that conducts operations on a storage array, transmitting storage commands via a storage adapter to a selected storage device of the storage array, and selectively directing storage commands to the RAID controller and the storage adapter.

In one embodiment, the method further includes emulating a RAID controller. By emulating the RAID controller, the method may provide alternate control of the storage array to a host computer or the like. In addition, enhanced or augmented services as well as backup or secondary control of the storage devices may be provided by the aforementioned method.

Various elements of the present invention are combined into a storage system of the present invention including a host computer, a storage array, a RAID controller operably connected to the storage array, a storage adapter operably connected to the storage array independent of a storage controller, and a control module residing on the host computer.

The control module of the present invention selectively directs storage commands to the RAID controller and the storage adapter. In response to receiving storage commands from the control module, the RAID controller executes corresponding operations on the storage array. Additionally, the control module may transmit storage commands from the control module to a selected storage device within the storage array via the storage adapter.

In another aspect of the present invention, a method for servicing a storage array includes operably connecting a storage array to a storage adapter independent of a RAID controller and installing a control module on the host computer. The method for servicing a storage array enables a technician or the like to provide diagnostic operations, data recovery, firmware updates and other services related to storage arrays.

The method for servicing a storage array may also include operably connecting a storage adapter to a storage array, and transmitting storage commands to one or more selected storage devices within the storage array. The method may also include disabling or quiescing the RAID controller and transferring control of the storage array to the storage adapter. Transferring control to the storage adapter allows the method to use an alternate control path to communicate with the storage devices. In communicating with the storage devices, the method may update firmware within a storage device, conduct diagnostic operations, conduct recovery operations or the like.

The various elements and aspects of the present invention provide a cost-effective alternative to a dedicated redundant RAID controller. Additionally, the present invention provides augmented services and features not found in currently available RAID storage systems. These and other features and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
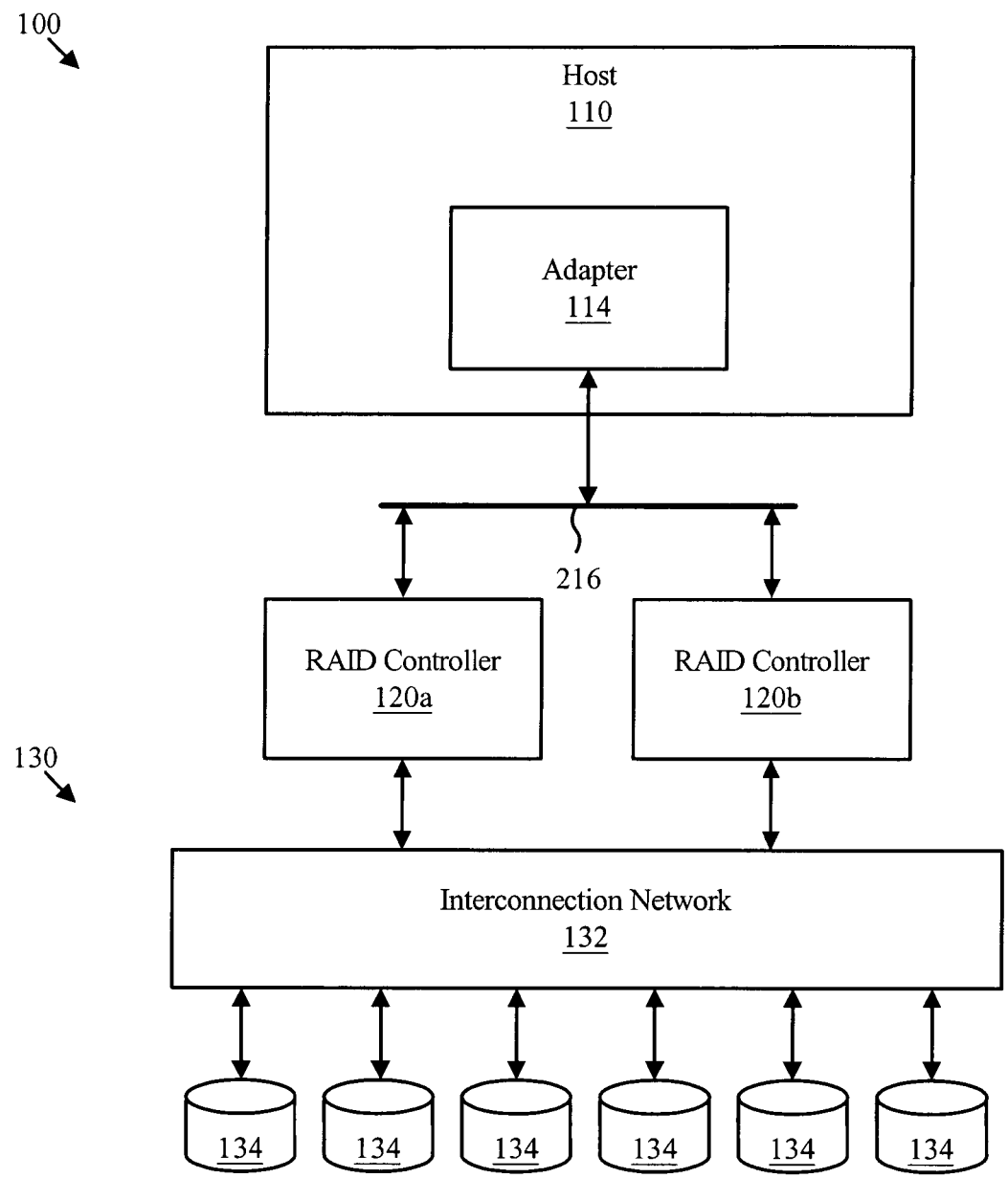
FIG. 1 is a schematic block diagram illustrating a typical prior art storage system.

FIG. 1 is a schematic block diagram illustrating a typical prior art storage system 100. The depicted storage system 100 includes a host 110, an adapter 114, a redundant set of RAID controllers 120, an interconnection network 132, and an array of storage devices 134. In the depicted storage system 100, the host 110 sends commands to the RAID controllers 120. In turn the RAID controllers 120 may communicate with the storage devices 134 via the interconnection network 132.

In one redundant arrangement, a primary RAID controller 120a executes operations on the storage devices 134 in response to commands issued by the host 110. In the aforementioned arrangement, a secondary RAID controller 120b may be activated in response to a failure by the primary RAID controller 120a. By activating the secondary RAID controller 120b in response to failure of the primary RAID controller 120a, reliability and availability of the storage system 100 is improved.

The cost of achieving the improved reliability of the storage system 100 may be substantial. The RAID controllers 120 are typically non-commodity specialized devices that are expensive to purchase, install, and maintain. For example, the RAID controllers often contain components that are highly specialized, quickly out-dated, and more expensive than general purpose storage controllers.

Figure 2:
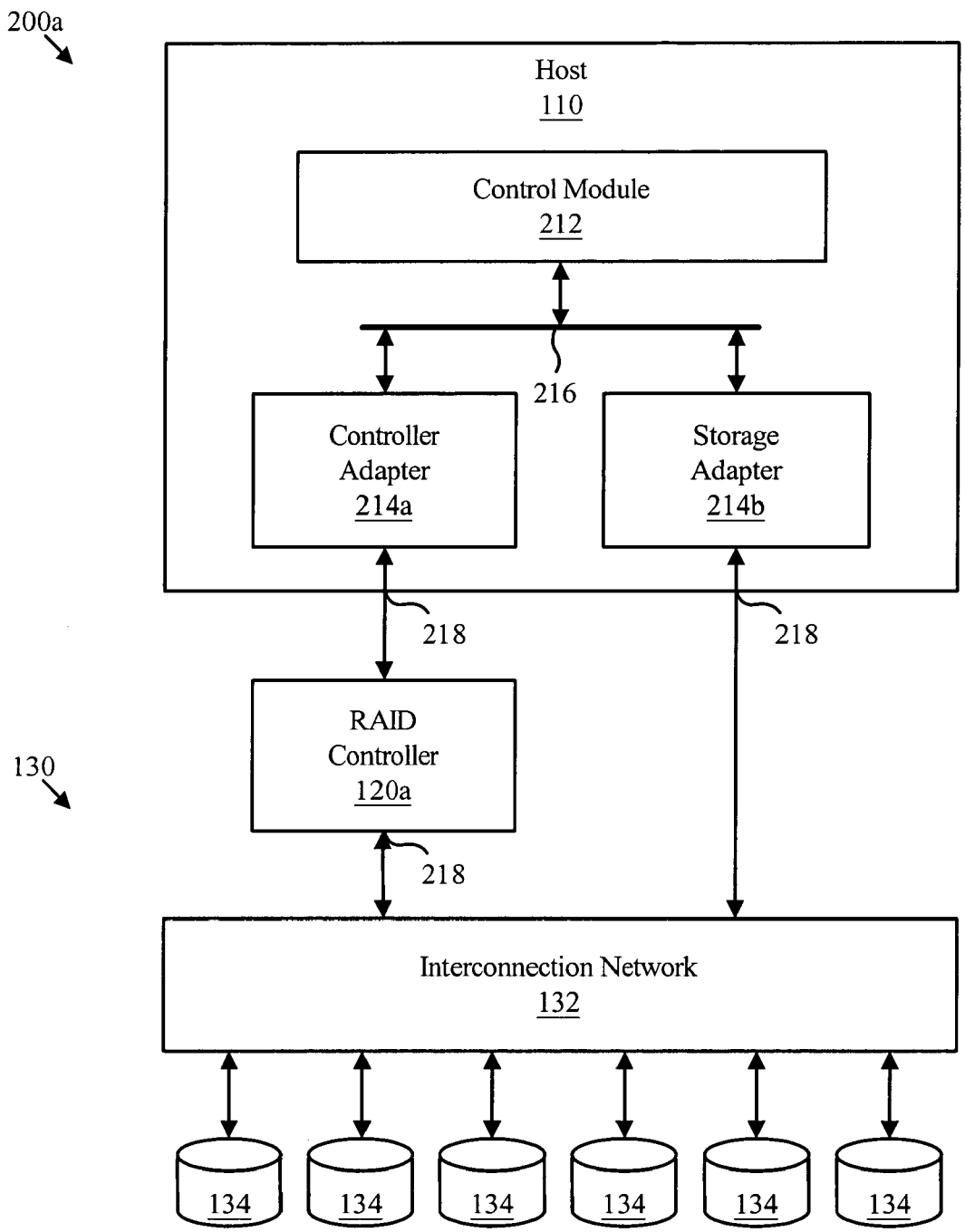
FIG. 2 is a schematic block diagram illustrating one embodiment of an alternate control storage system of the present invention.
Figure 3:
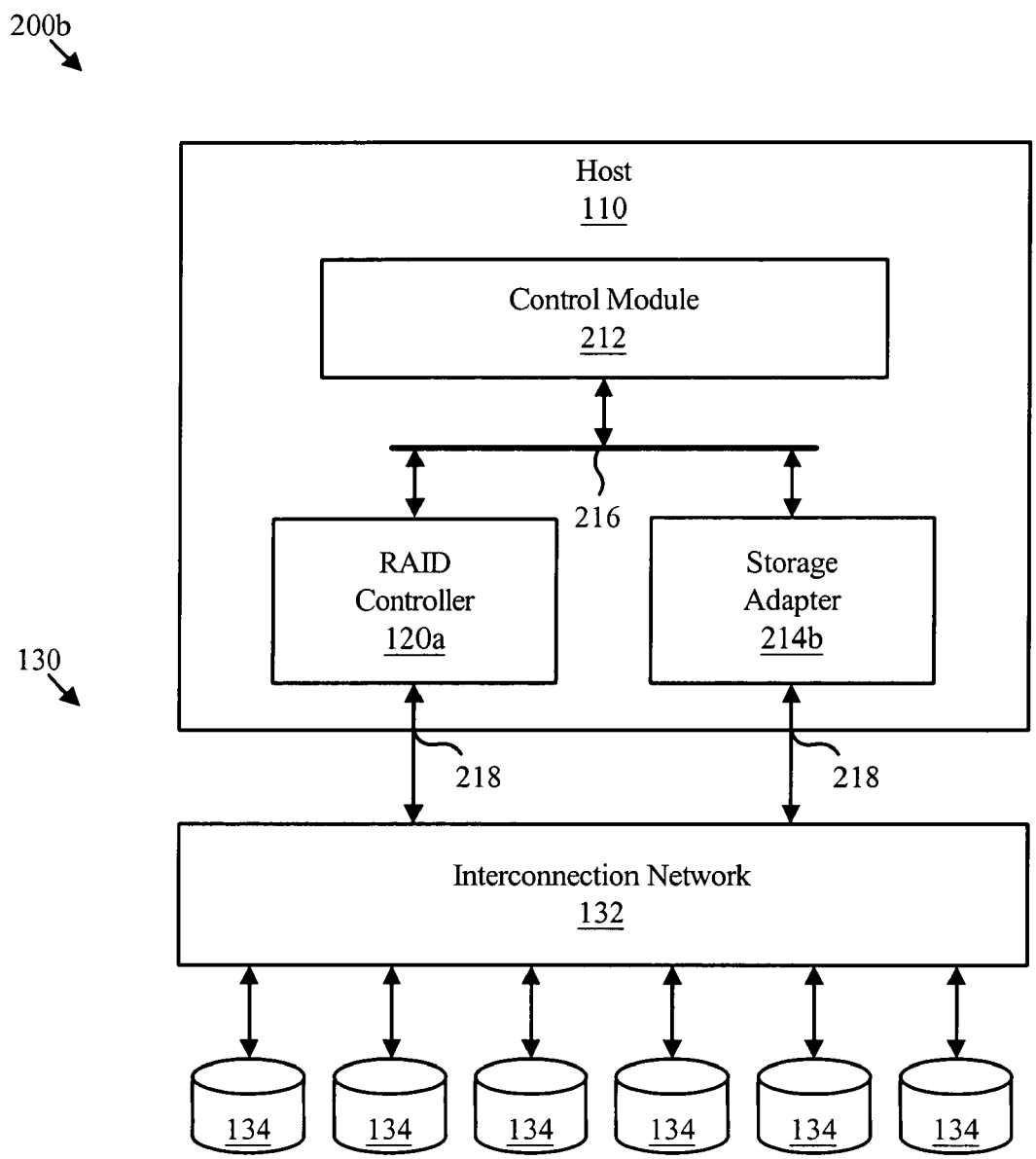
FIG. 3 is a schematic block diagram illustrating an additional embodiment of the alternate control storage system of the present invention.

FIGS. 2 and 3 are schematic block diagrams illustrating selected embodiments of an alternate control storage system 200 of the present invention. As depicted, the alternate control storage system 200 includes a host 110, a primary RAID controller 120a, an interconnection network 132, one or more storage devices 134, a control module 212, one or more adapters 214, an internal bus 216, and multiple interface ports 218. The alternate control storage system 200 is a low-cost, resource-efficient alternative to currently available redundant storage systems.

FIG. 2 depicts a particular embodiment of the alternate control storage system 200, namely an alternate control storage system 200a, wherein the primary RAID controller 120a is external to the host 110. Likewise, FIG. 3 depicts a particular embodiment of the alternate control storage system 200, namely an alternate control storage system 200b, wherein the primary RAID controller 120a resides on the host 110.

The host 110 may interface to the primary RAID controller 120a via the internal bus 216 as depicted in FIG. 2, or via one of the interface ports 218 as depicted in FIG. 3. In turn, the primary RAID controller 120a communicates with the storage devices 134 via the interconnection network 132. To facilitate communication with the interconnection network 132, the primary RAID controller 120a may include one or more interface ports 218 that provide a storage interface or storage network interface such as a SCSI interface, an SSA interface, a fiberchannel interface, an IDE interface, an ethernet interface, or the like.

In the depicted alternate control storage system 200a, the control module 212 and the adapters 214 reside on the host 110. The host 110 executes computer readable program code. One of the adapters 214 may be a controller adapter 214a while another may be a storage adapter 214b. During normal operation, the control module 212 directs standard storage commands to the primary RAID controller 120a via the controller adapter 214a. In turn, the primary RAID controller 120a executes operations on the storage devices 134.

In one embodiment, in response to failure of the primary RAID controller 120a, the control module 212 emulates the primary RAID controller 120a by receiving commands from the host and executing corresponding operations on the storage devices 134 via the storage adapter 214b and the interconnection network 132. Thus, the control module 212 and the storage adapter 214b essentially emulate a RAID controller 120, eliminating the need to include an expensive secondary RAID controller 120b.

In one embodiment, the adapters 214, including the controller adapter 214a and the storage adapter 214b, may be SCSI adapters, SSA adapters, fiberchannel adapters, IDE adapters, or the like. The aforementioned adapters 214 are typically significantly less expensive than the RAID controllers 120.

In one embodiment, the control module 212 disables or quiesces the primary RAID controller 120a in response to failure of the primary RAID controller 120a. The control module 212 may also include a driver configured to translate operating system calls into storage commands. These operations may include augmented or enhanced services such as recovery operations, diagnostic operations, firmware update operations, and the like.

In the depicted alternate control storage system 200b, the primary RAID controller 120a resides on the host 110 and receives storage commands via the internal bus 216. In one embodiment, the primary RAID controller 120a is a peripheral card such as a PCI card, that is inserted into a slot to electrically connect to the internal bus 216. In another embodiment, the primary RAID controller 120a is integrated onto a motherboard residing on the host 110 and directly connected to the internal bus 216. In either arrangement, placing the primary RAID controller 120a within the host 110 may eliminate interface hardware associated with the external primary RAID controller 120a, increase system performance, and reduce the cost of providing redundancy within a storage system.

Figure 4:
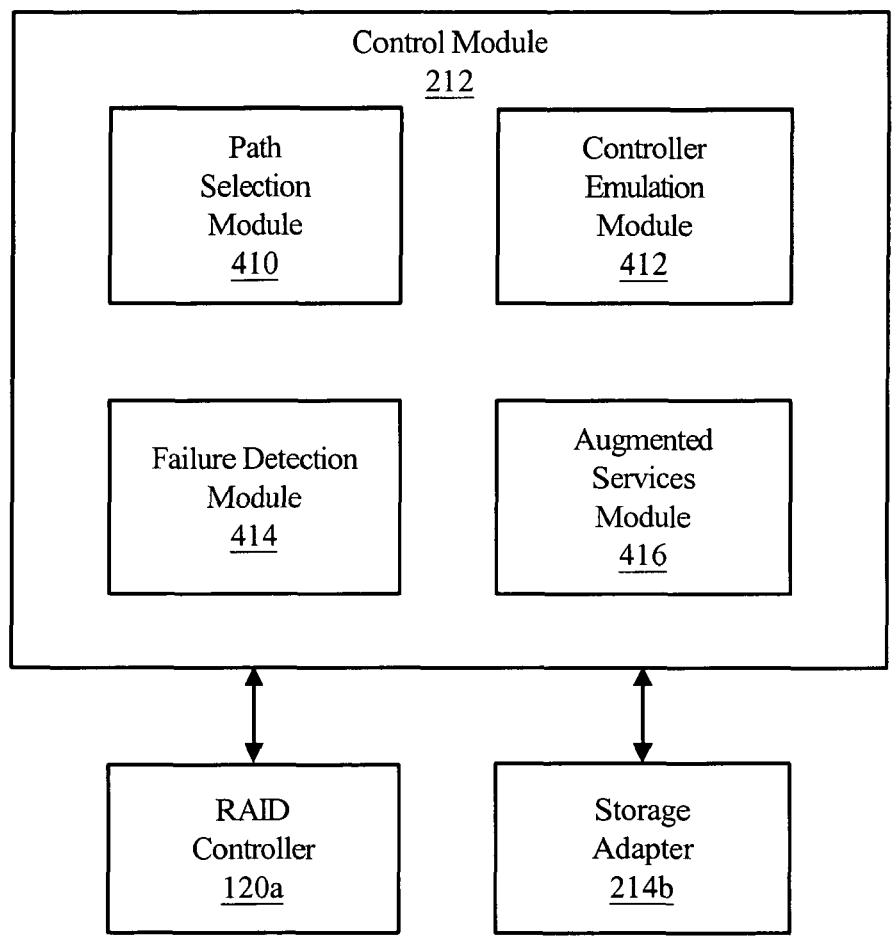
FIG. 4 is a schematic block diagram illustrating one embodiment of a storage control apparatus of the present invention.

FIG. 4 is a schematic block diagram illustrating one embodiment of a storage 13 control apparatus 400 of the present invention. As depicted, the storage control apparatus 400 includes a control module 212, a primary RAID controller 120a, a storage adapter 214b, a path selection module 410, a RAID controller emulation module 412, a failure detection module 414, and an augmented services module 416. The control module 212 facilitates redundant control of a storage array using a single RAID controller 120a.

The path selection module 410 directs storage commands to either the primary RAID controller 120a or the storage adapter 214b. In one embodiment, the path selection module 410 is essentially a multipath software layer within the system code of the host. During normal operation, the path selection module 410 directs standard storage commands received from the host 110 to the primary RAID controller 120a.

In one embodiment, the failure detection module 414 informs the path selection module 410 when the primary RAID controller 120a is not functioning properly. In response to the failure, the path selection module 410 directs commands received from the host 110 to the RAID controller emulation module 412. When activated, the emulation module 412 may translate high-level storage commands including RAID commands into corresponding low-level storage commands supported by the storage devices 134.

During normal operation, the path selection module 410 may also direct requests for augmented or enhanced services to the augmented services module. The augmented services module 416 performs services on the storage devices 134 that are not available on the RAID controller 120a.

In one embodiment, the primary RAID controller 120a and the storage adapter 214b may both communicate with the storage devices 134 simultaneously through managed synchronization. While the primary RAID controller 120a is executing operations on the storage devices 134, the storage adapter 214b may also perform augmented services on the storage devices 134. In other embodiments, the RAID controller 120a is put on standby or is disabled during service operations conducted by the storage adapter 214b.

Figure 5A:
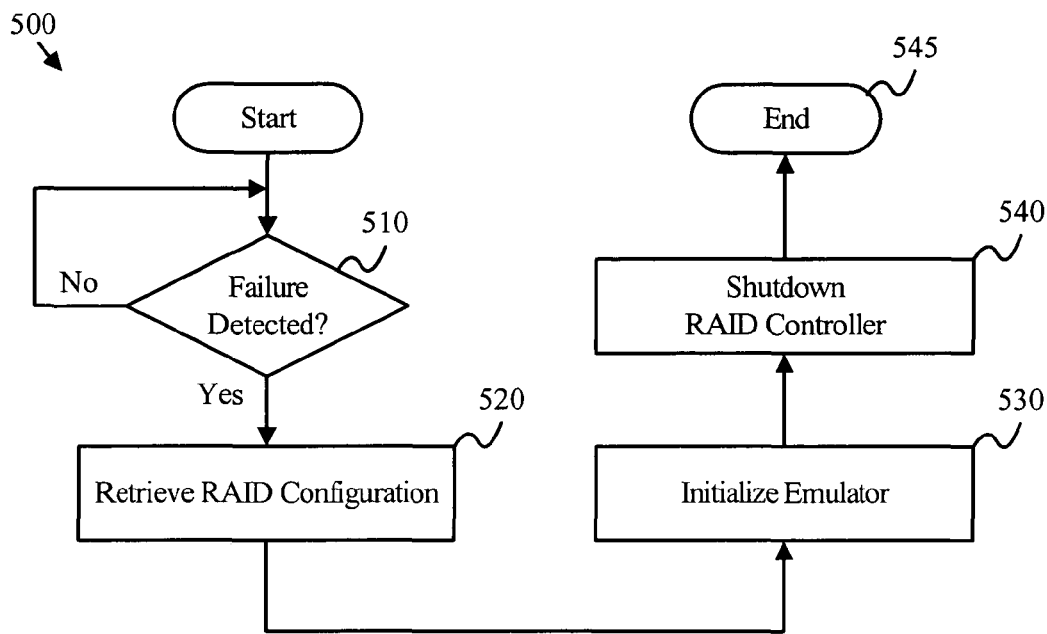
FIG. 5 is a flow chart diagram illustrating one embodiment of a storage control method of the present invention.

FIG. 5a is a flow chart illustrating one embodiment of a failure response method 500 of the present invention. The storage control method 500 may be conducted in conjunction with the storage control apparatus 400, the storage system 200a, 200b, or the like. As depicted, the failure response method 500 includes a failure detected test 510, a retrieve configuration step 520, an initialize emulator step 530, and a shutdown RAID controller step 540. The failure response method 500 facilitates fault tolerant handling of RAID control failures.

While depicted in a certain sequential order, the depicted functionality of the failure response method 500 may be conducted in various sequences according to the needs and capabilities of the particular embodiment. For example, in one embodiment the depicted functionality is invoked by system events such that the order of execution is event dependent.

The failure detected test 510 ascertains whether a failure has occurred to a RAID controller. In one embodiment, status query messages are sent to the RAID controller and a timeout event is set in case the RAID controller does not respond. In another embodiment, status registers on the RAID controller are accessed to assess the status of the controller. In yet another embodiment, a test sequence such as sending a write command to the RAID controller and accessing striping information on individual storage devices is conducted in order to ascertain if the RAID controller is functioning properly.

The retrieve configuration step 520 retrieves RAID configuration information such as RAID level and striping information from local configuration files, system configuration files, registers within one or more RAID controllers, or similar sources. The RAID configuration information may facilitate providing augmented services or alternate control of a RAID array. For example, the RAID configuration information may facilitate monitoring a RAID controller, detecting RAID controller failures and emulating a RAID controller.

The initialize emulator step 530 initializes a controller emulator such as a RAID controller emulator. In one embodiment, the initialize emulator step 530 uses the configuration information retrieved at step 510 to initialize the controller emulation module depicted in FIG. 4.

The shutdown controller step 540 attempts to shutdown a faulty RAID controller, or the like. In one embodiment, the controller is quiesced to clear the processing queues within the controller. Subsequently data caches on the controller may be flushed to clear any write data within data caches, and followed by invocation of a disable command to prevent further processing by the controller. In response to completion of the shutdown controller step 540 the depicted failure response method 500 ends 545.

Figure 5B:
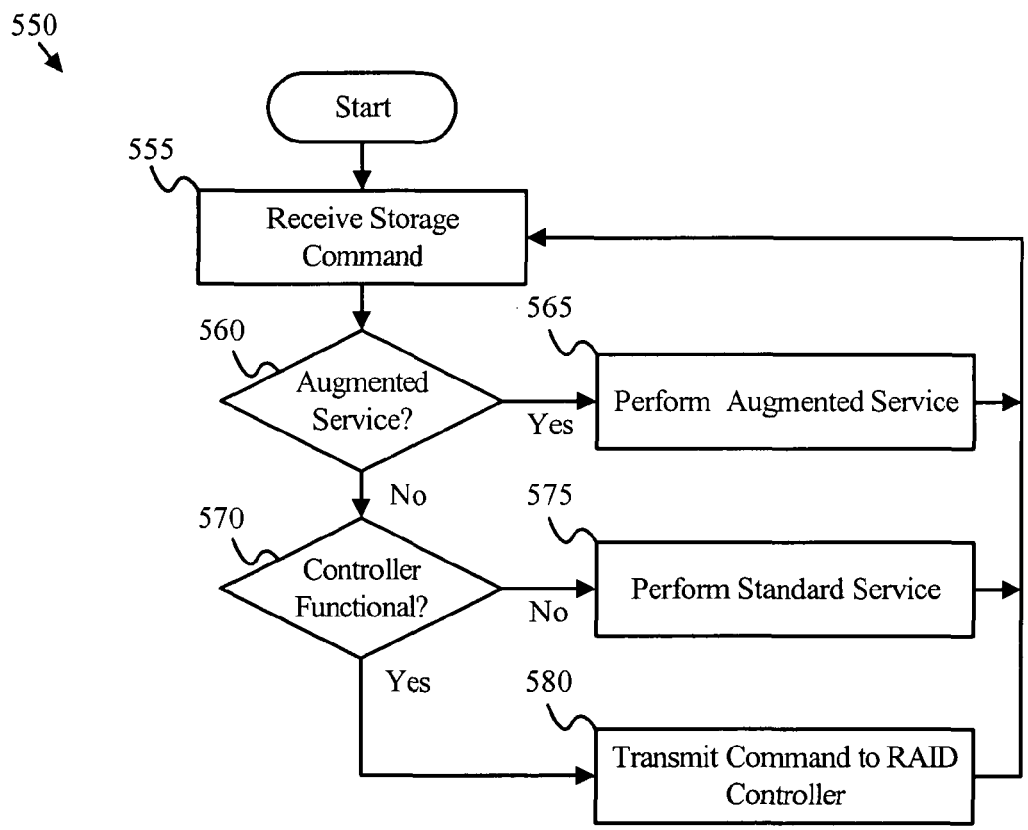

FIG. 5b is a flow chart illustrating one embodiment of a storage control method 550 of the present invention. The storage control method 550 may be conducted in conjunction with the storage control apparatus 400, the storage system 200a, 200b, or the like. The depicted embodiment of the storage control method 550 includes a receive command step 555, an augmented service test 560, a perform augmented service step 565, a controller functional test 570, a perform standard service step 575, and a transmit command step 580.

The method begins with the receive command step 555. In one embodiment, a storage command or the like is received from a storage manager or the like executing on the host 110. Upon reception of the storage command, the method proceeds to the augmented service test 560. At the augmented service test 560, the method 500 determines whether the command corresponds to an augmented or enhanced service.

If the received command corresponds to an augmented or enhanced service, the method proceeds to the perform augmented service step 565. In one embodiment, the augmented services include disabling or quiescing the RAID controller, conducting diagnostic operations, recovery operations, firmware updates, or the like. Upon completion of the perform augmented service step 565, the storage control method 550 loops to the receive command step 555.

If an augmented or enhanced service was not requested, the method continues with the controller functional test 570. At the controller functional test, 570 the method determines whether a dedicated controller (such as a RAID controller) is functional. If the dedicated controller is not functional, the method proceeds to the perform standard service step 575. In one embodiment, standard services are performed by an emulation module and include conducting RAID operations on a storage array. Upon completion of the perform augmented service step 565, the storage control method 550 loops to the receive command step 555.

If the controller is functional, the storage control method 500 proceeds to the transmit command step 580 in order to invoke the supported service within the RAID controller or the like. Thereafter, the method 550 returns to the receive storage command step 555. The depicted storage control method 550 facilitates providing alternate control of a storage array in the event of a failure of a dedicated controller while also providing host-based augmented storage services not available on the dedicated controller.

Figure 6:
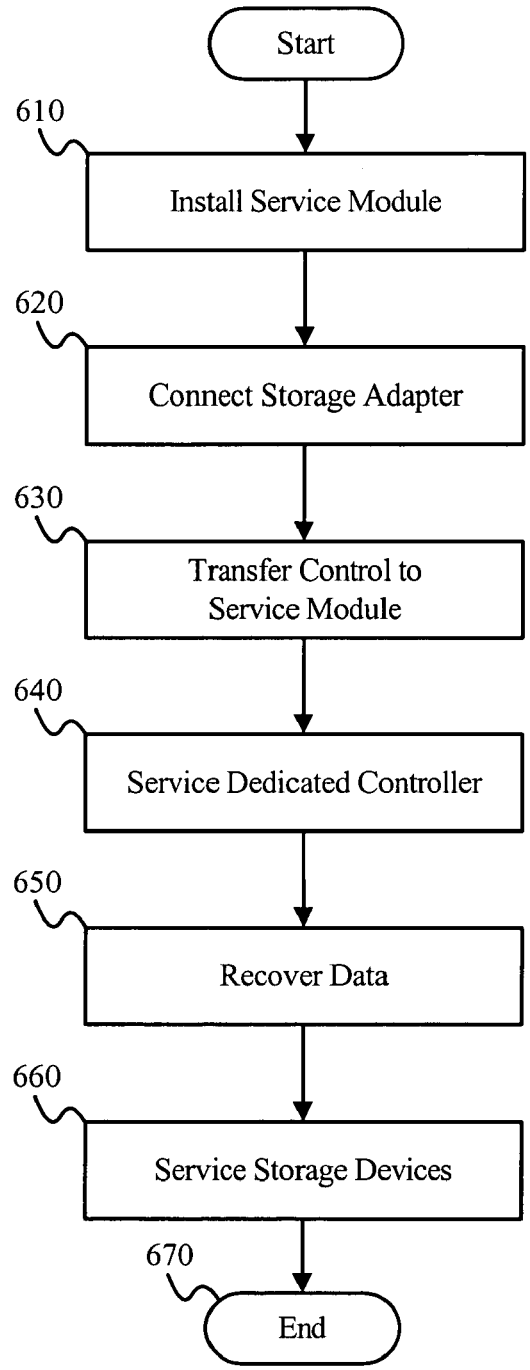
FIG. 6 is a flow chart diagram illustrating a storage system service method of the present invention.

FIG. 6 is a flow chart illustrating one embodiment of a storage system service method 600 of the present invention. The depicted storage system service method 600 includes an install service module step 610, a connect storage adapter step 620, a transfer control step 630, a service controller step 640, a recover data step 650, and a service storage devices step 660.

The depicted storage system service method 600 may be performed by a service technician or the like in order to install or service the alternate control system 200 or the like. While depicted in a certain sequential order, the depicted steps may be performed in a manner or order appropriate to the particular system being serviced. For example, the service controller step 640 and the recover data step 650 may be omitted in systems wherein the steps are not needed.

The install service module step 610 installs a service module, or the like, on the host 110. In one embodiment, the service module 610 is essentially the control module 212 with additional functionality appropriate to installing or servicing the alternate control storage system 200, or the like.

The installed service module may perform or direct completion of the storage system service method 600. At the connect storage adapter step 620, a storage adapter such as the storage adapter 214*b* is connected to a storage array such as the storage devices 134 via an interconnection network such as the interconnection network 132. In one embodiment, the service module (not shown) executing on the host computer indicates which storage devices 134 are accessible via the storage adapter 214*b*. The storage adapter 214*b* may be an adapter newly installed in conjunction with step 620 or an adapter previously available on the host 110.

In conjunction with the install service module step 610 and the connect storage adapter step 620, RAID configuration information such as RAID level and striping information may be retrieved from system configuration files, registers within one or more RAID controllers, or similar sources. The RAID configuration information may facilitate providing augmented services or alternate control of a RAID array. For example, the RAID configuration information may facilitate monitoring a RAID controller, detecting RAID controller failures and emulating a RAID controller.

The transfer control step 630 transfers control of the storage devices to the service module (not shown), the control module 212, or the like. In one embodiment, transferring control includes quiescing or disabling a dedicated controller such as the RAID controller 120*a*. Transferring control may facilitate continued operation while performing diagnostic or maintenance services on the storage system.

The service controller step 640 services a dedicated controller such as the RAID controller 120*a*. In one embodiment, servicing the dedicated controller includes updating firmware on the controller. In another embodiment, servicing the dedicated controller includes replacing the controller with a different controller.

The recover data step 650 performs data recovery operations. In one embodiment, the data recovery operations restore images on the storage devices 134 to a desired state. In another embodiment, the data recovery operations transfer data within obsolete storage devices to newly installed storage devices.

The service storage devices step 660 services the storage devices 134 or the like. In one embodiment, servicing the storage devices 134 includes updating firmware associated with the storage devices 134. In another embodiment, servicing the storage devices 134 includes conducting diagnostic operations.

Figure 7:
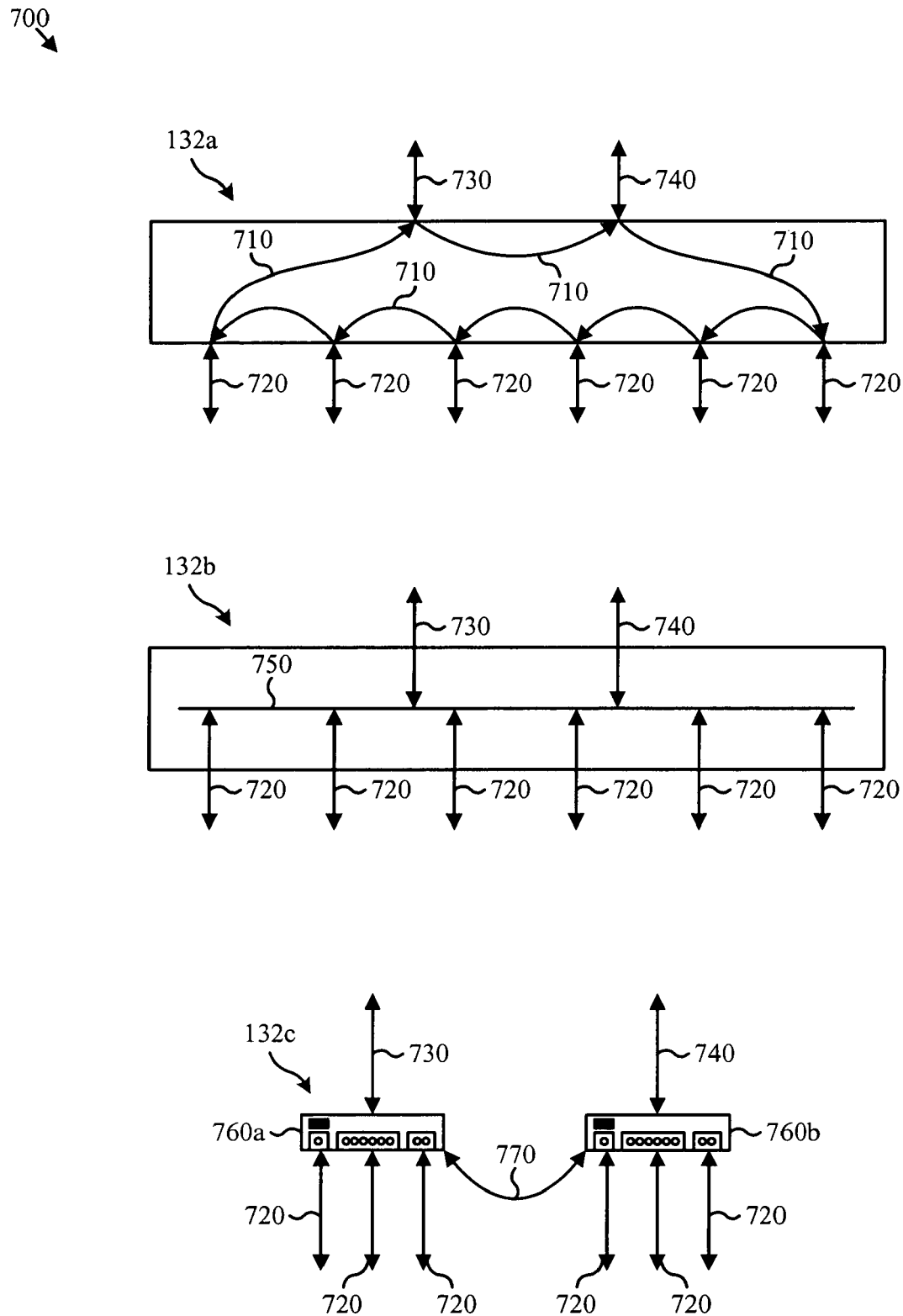
FIG. 7 is a schematic block diagram illustrating selected embodiments of an interconnection network in accordance with the present invention.

FIG. 7 is a schematic block diagram illustrating selected embodiments of the interconnection network 132 in accordance with the present invention. The depicted embodiments of the interconnection network 132 are intended to illustrate without limitation various interconnection technologies and topologies that may be used with the present invention. The interconnection network 132 may include a variety of elements appropriate to interconnecting storage devices such as point-to-point connections 710, storage device connections 720, controller connections 730, redundant controller connections 740, parallel buses 750, hubs 760, and hub interconnections 770.

The controller connection 730 provides operable connectivity such as electrical, optical, or wireless connectivity from and to a dedicated controller, such as the RAID controller 120*a*. The redundant connection 740 provides operable connectivity such as electrical, optical, or wireless connectivity from and to a host-based storage adapter such as the storage adapter 214*b*. The storage device connections 720 provide operable connectivity such as electrical, optical, or wireless connectivity from and to storage devices such as the storage devices 134 depicted in various Figures.

The selected embodiments shown in FIG. 7 include a point-to-point interconnection network 132*a*, a bused interconnection network 132*b*, and a storage area network 132*c*. The depicted point-to-point interconnection network 132*a* includes a set of point-to-point connections 710, such as fiberchannel connections or the like, that operably connect the controller connection 730, the redundant controller connection 740, and the storage device connections 720. In one embodiment, the point-to-point connections 710 form a loop of bi-directional connections such that the interconnection network 132*a* remains functional in the event of a device or connection failure.

The depicted bused interconnection network 132*b* includes a parallel bus 750. The parallel bus 750 operably connects the controller connection 730, the redundant controller connection 740, and the storage device connections 720. The parallel bus 750 enables operative commands to be sent to each storage device in parallel. Through the controller connection 730, the dedicated controller, such as a controller, sends operative commands. The operative commands travel through the parallel bus 750 to the storage device connections 720. Storage devices such as the storage devices 134 receive the operative commands from the storage device connections 720.

The depicted storage area network 132*c* includes one or more hubs 760 connected by one or more hub interconnects 770. In the depicted embodiment, two hubs 760 are shown connected by one hub interconnect 770. The hub 760*a* is operably connected to the controller connection 730 and the storage device connections 720. The hub 760*b* is operably connected to the redundant controller connection 740 and additional storage device connections 720. The hub 760*a* receives operative commands from the dedicated controller, such as a RAID controller, from the controller connection 730. The operative commands pass to the storage device connections 720 via hub 760*a* and the hub 760*b*.

The present invention provides secondary or augmented control of a storage array in a cost-effective manner. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for alternate control of a storage array, the apparatus comprising: a RAID controller operably connected to a storage array, the RAID controller configured to receive storage commands from a host computer and execute corresponding operations on the storage array;

a storage adapter residing on the host computer, the storage adapter operably connected to the storage array independent of the RAID controller, the storage adapter configured to transmit storage commands to a selected storage device within the storage array;

an augmented services module residing on the host computer, wherein the augmented services module performs services on the selected storage device within the storage array when said services are not available on the RAID controller; and a control module residing on the host computer, the control module configured to selectively direct storage commands to the RAID controller and the storage adapter, wherein in response to detecting a RAID controller fault the control module retrieves RAID configuration information from the RAID controller, quiesces the RAID controller, and directs storage commands to the storage adapter so that the storage adapter emulates the RAID controller in conducting RAID operations on the storage array.

2. The apparatus of claim 1, wherein the storage adapter is selected from the group consisting of a SCSI adapter, an SSA adapter, a fiberchannel adapter, and an IDE adapter.

3. The apparatus of claim 1, wherein the control module comprises a multipath software layer.

4. The apparatus of claim 1, wherein the RAID controller is selected from the group consisting of a SCSI RAID controller, an SSA RAID controller, a fiberchannel RAID controller, and an IDE RAID controller.

5. The apparatus of claim 1, wherein the RAID controller resides on the host computer.

6. The apparatus of claim 1, further comprising a controller adapter residing on the host computer, the controller adapter configured to operably connect the host computer and the RAID controller.

7. The apparatus of claim 1, wherein the control module is further configured to disable the RAID controller.

8. The apparatus of claim 1, wherein the control module is further configured to conduct operations selected from the group consisting of read operations, write operations, recovery operations, formatting operations, and firmware update operations.

9. The apparatus of claim 1, wherein the control module comprises a driver configured to translate operating system calls to storage commands.

10. A method for alternate control of a storage array, the method comprising:

transmitting storage commands to a RAID controller configured to conduct storage operations on a storage array;

transmitting storage commands via a storage adapter to a selected storage device within the storage array, wherein the storage adapter is operably connected to the storage array independent of the RAID controller;

directing an augmented services module to perform services on the selected storage device within the storage array when said services are not available on the RAID controller; and selectively directing storage commands to the RAID controller and the storage adapter, wherein storage commands are directed to the storage adapter in response to detecting a RAID controller fault by retrieving RAID configuration information from the RAID controller, quiescing the RAID controller, and directing storage commands to the storage adapter so that the storage emulates the RAID controller in conducting RAID operations on the storage array.

11. The method of claim 10, further comprising disabling the RAID controller.

12. The method of claim 10, further comprising conducting storage operations via the storage adapter, wherein the storage operations are selected from the group consisting of read operations, write operations, recovery operations, formatting operations, and firmware update operations.

13. The method of claim 10, further comprising disabling the storage adapter.

14. The method of claim 10, further comprising quiescing the storage adapter.

15. The method of claim 10, further comprising translating operating system calls to storage operations.

16. A system for alternate control of a storage array, the system comprising:

a host computer;

a storage array comprising a plurality of storage devices;

a RAID controller operably connected to the storage array, the RAID controller configured to receive storage commands and conduct storage operations on the storage array in response to commands received from the host computer;

a storage adapter operably connected to the storage array independent of a storage controller, the storage adapter configured to transmit storage commands to a selected storage device within the storage array;

an augmented services module residing on the host computer, wherein the augmented services module performs services on the selected storage device within the storage array when said services are not available on the RAID controller; and a control module residing on the host computer, the control module configured to selectively direct storage commands to the RAID controller and the storage adapter, wherein in response to detecting a RAID controller fault the control module retrieves RAID configuration information from the RAID controller, quiesces the RAID controller, and directs storage commands to the storage adapter so that the storage adapter emulates the RAID controller in conducting RAID operations on the storage array.

17. The system of claim 16, wherein the RAID storage operations are selected from the group consisting of read operations, write operations, recovery operations, formatting operations, and firmware update operations.

18. A computer readable storage medium comprising computer readable program code for alternate control of a storage array, the program code configured to:

transmit storage commands to a RAID controller configured to conduct RAID operations on a storage array;

transmit storage commands via a storage adapter to a selected storage device within the storage array, wherein the storage adapter is operably connected to the storage array independent of the RAID controller;

directing an augmented services module to perform services on the selected storage device within the storage array when said services are not available on the RAID controller; and selectively direct storage commands to the RAID controller and the storage adapter, wherein storage commands are directed to the storage adapter in response to detecting a RAID controller fault by retrieving RAID configuration information from the RAID controller, quiescing the RAID controller, and directing storage commands to the storage adapter so that the storage emulates the RAID controller in conducting RAID operations on the storage array.

19. The computer readable storage medium of claim 18, wherein the program code is further configured to disable the RAID controller.

20. The computer readable storage medium of claim 18, wherein the RAID storage operations are selected from the group consisting of read operations, write operations, recovery operations, formatting operations, and firmware update operations.

21. A method for servicing a storage array, the method comprising:
operably connecting a storage array to a storage adapter independent of a RAID controller, the storage adapter configured to transmit storage commands to a selected storage device within the storage array, the storage adapter residing in a host computer;
directing an augmented services module residing on the host computer to perform services on the selected storage device within the storage array when said services are not available on the RAID controller; and
installing a control module residing on the host computer, the control module configured to selectively direct storage commands to the RAID controller and the storage adapter, wherein in response to detecting a RAID controller fault the control module retrieves RAID configuration information from the RAID controller, quiesces the RAID controller, and directs storage commands to the storage adapter so that the storage adapter emulates the RAID controller in conducting RAID operations on the storage array.

22. The method of claim 21, further comprising disabling the RAID controller.

23. The method of claim 21, further comprising transferring control of the storage array to the storage adapter.

24. The method of claim 21, further comprising servicing the RAID controller.

25. The method of claim 21, further comprising updating firmware within a storage device.

26. The method of claim 21, further comprising conducting diagnostic operations.

27. The method of claim 21, further comprising conducting recovery operations.

28. The method of claim 21, wherein the RAID storage operations are selected from the group consisting of read operations, write operations, recovery operations, formatting operations, and firmware update operations.

* * * * *